Patented Aug. 24, 1937

2,090,953

UNITED STATES PATENT OFFICE 2,090,953

PRODUCTION OF TRIALKYLAMINES

Karl Smeykal, Leuna, Germany, assignor to I. G. Farbenindustrie Aktiengesellschaft, Frankfort-on-the-Main, Germany No Drawing. Application November 19, 1934, Serial No. 753,726. In Germany November 28, 1933

7 Claims. (Cl. 260—127)

The present invention relates to a new process of producing trialyklamines.

I have found that trialkylamines the alky groups of which contain a small number of carbon atoms are obtained in a very advantageous manner by leading dialkylamines, the alkyl groups of which contain a small number of carbon atoms, or mixtures thereof in the vapor phase at elevated temperatures, preferably under superatmospheric pressure, over dehydration catalysts. Especially suitable initial materials are those dialkylamines the alkyl groups of which contain up to 2 carbon atoms, such as diethylamine and, preferably dimethylamine. In the process according to the present invention there is formed a mixture of amines having different numbers of alkyl groups and containing a large amount of tertiary amines, for example, a mixture of the three methylamines having a high content of trimethylamine (generally speaking from about 60 to 65 per cent). The trimethylamine may be readily recovered from the crude amine mixture by fractional distillation under pressure. The unconverted dimethylamine may be used again after being recovered from the reaction mixture.

The process is, generally speaking, carried out at temperatures of from about 200° to 450° C.; for the production of trimethylamine it is advantageous to work at between about 300° and 420° C. At temperatures of more than 450° C. there are frequently formed undesirable by-products of nitrogen bases, which are liquid at atmospheric pressure and ordinary temperature and which probably consist of compounds of the nature of pyridine or quinoline. It is preferable to carry out the process under pressure, because in this way the speed of the reaction is very considerably increased so that a high yield per unit of space and time is obtained without the formation of undesirable by-products. For example, pressures above 5 atmospheres, preferably between 50 and 250 atmospheres, are employed.

As dehydration catalysts, i. e., catalysts which are capable of catalytically splitting off water from organic compounds containing hydroxyl groups, there may be mentioned, for example, aluminium oxide, thorium oxide, molybdenum oxide or tungsten oxide, or aluminium silicate, aluminium phosphate, silica gel or kaolin. The catalysts to be used may also contain small amounts of activating substances, such as chromium oxide, zinc oxide, zinc phosphate, cerium oxide, titanium oxide or vanadium oxide. In some cases it is advantageous to employ catalysts precipitated on carrier substances, for example, on pumice stone.

The following example will further illustrate the nature of this invention, but the invention is not restricted to this example. The percentages are by weight.

Example

Anhydrous liquid dimethylamine is pressed into a high pressure apparatus in which it is vaporized under a pressure of 200 atmospheres by the application of heat. The vapors are then led at 380° C. over a catalyst consisting of pieces of alumina gel. The amount of dimethylamine (measured as the volume of liquid) which is led over the catalyst per hour amounts to about twice the volume of the catalyst. The reaction products are condensed by cooling to 25° C. while reducing the pressure to 10 atmospheres. A mixture is obtained which consists of 64 per cent of trimethylamine, 22 per cent of dimethylamine, 11 per cent of monomethylamine and 3 per cent of ammonia.

In order to separate the trimethylamine from the remaining constituents of the mixture of bases, the whole is subjected to fractional distillation under pressure. The first runnings at 25° C. under a pressure of 11 atmospheres is a small amount of the azeotropic mixture of ammonia and trimethylamine. When the whole of the first runnings has passed over, the pressure is increased to 25 atmospheres by pressing in nitrogen; under this pressure mono- and tri-methylamine do not form an azeotropic mixture. After a small intermediate fraction, pure monomethylamine passes over at from 102° to 105° C. under 25 atmospheres pressure, then dimethylamine passes over at from 123° to 126° C., while pure trimethylamine remains behind. In this manner there are obtained from each 100 kilograms of the crude mixture of bases of the above composition, 4 kilograms of a mixture of ammonia and trimethylamine, 10 kilograms of monomethylamine, 18.5 kilograms of dimethylamine and more than 60 kilograms of trimethylamine.

A similar procedure is followed for the production of triethylamine from diethylamine.

What I claim is:—

1. The process of producing trialkylamines the alkyl groups of which contain up to 2 carbon atoms, which comprises leading a dialkylamine the alkyl groups of which contain up to 2 carbon atoms in the vapor phase at a temperature between about 200° and about 450° C. over a dehydration catalyst.

2. The process of producing trimethylamine, which comprises leading dimethylamine in the vapor phase at a temperature between about 200° and about 450° C. under a pressure above 5 atmospheres over a dehydration catalyst.

3. The process of producing trimethylamine, which comprises leading dimethylamine in the vapor phase at a temperature of about 380° C. under a pressure of about 200 atmospheres over alumina gel.

4. The process of producing trialkylamines the alkyl groups of which contain up to 2 carbon atoms, which comprises leading a dialkylamine the alkyl groups of which contain up to 2 carbon atoms in the vapor phase at a temperature between about 200° and about 450° C. under a pressure above 5 atmospheres over a dehydration catalyst.

5. The process of producing trialkylamines the alkyl groups of which contain up to 2 carbon atoms, which comprises leading a dialkylamine the alkyl groups of which contain up to 2 carbon atoms in the vapor phase at a temperature between about 200° and about 450° C. under a pressure between 50 and 250 atmospheres over a dehydration catalyst.

6. The process of producing trialkylamines the alkyl groups of which contain up to 2 carbon atoms, which comprises leading a dialkylamine the alkyl groups of which contain up to 2 carbon atoms in the vapor phase at a temperature between about 300° and about 420° C. under a pressure above 5 atmospheres over a dehydration catalyst.

7. The process of producing trialkylamines the alkyl groups of which contain up to 2 carbon atoms, which comprises leading a dialkylamine the alkyl groups of which contain up to 2 carbon atoms in the vapor phase at a temperature between about 300° and about 420° C. under a pressure between 50 and 250 atmospheres over a dehydration catalyst.

KARL SMEYKAL.